(12) United States Patent
Aurongzeb et al.

(10) Patent No.: US 11,628,661 B2
(45) Date of Patent: Apr. 18, 2023

(54) DISPLAY ASSEMBLY WITH RECYCLED CONTENT FOR AN INFORMATION HANDLING SYSTEM

(71) Applicant: Dell Products L.P., Round Rock, TX (US)

(72) Inventors: Deeder M. Aurongzeb, Austin, TX (US); Peng Lip Goh, Singapore (SG); Fook Weng Mok, Singapore (SG); Kevin Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/471,779

(22) Filed: Sep. 10, 2021

(65) Prior Publication Data
US 2023/0077357 A1     Mar. 16, 2023

(51) Int. Cl.
*B32B 37/12* (2006.01)
*F21V 8/00* (2006.01)
*B32B 27/36* (2006.01)
*B32B 27/32* (2006.01)
*B32B 27/28* (2006.01)

(52) U.S. Cl.
CPC ............ *B32B 37/12* (2013.01); *B32B 27/286* (2013.01); *B32B 27/325* (2013.01); *B32B 27/36* (2013.01); *B32B 27/365* (2013.01); *G02B 6/0051* (2013.01); *G02B 6/0088* (2013.01); *B32B 2272/00* (2013.01); *B32B 2367/00* (2013.01); *B32B 2457/20* (2013.01); *C09J 2203/318* (2013.01); *C09K 2323/035* (2020.08); *C09K 2323/05* (2020.08)

(58) Field of Classification Search
CPC ..... B32B 37/12; B32B 27/286; B32B 27/325; B32B 27/36; B32B 27/365; B32B 2272/00; B32B 2367/00; B32B 2457/20; C09K 2323/035; C09K 2323/05
USPC .......................................... 428/1.1, 1.33, 1.5
See application file for complete search history.

(56) References Cited

U.S. PATENT DOCUMENTS

| | | | |
|---|---|---|---|
| 2007/0008566 A1* | 1/2007 | Leone, III | G06F 40/166 358/1.13 |
| 2007/0147023 A1* | 6/2007 | Matsushita | G02F 1/133606 362/97.3 |
| 2018/0120611 A1* | 5/2018 | Ko | G02F 1/133528 |

* cited by examiner

*Primary Examiner* — Ruiyun Zhang
(74) *Attorney, Agent, or Firm* — Norton Rose Fulbright US LLP

(57) ABSTRACT

An increase in the amount of recycled plastic used in a display assembly can be obtained by introducing other types of plastic material that allow increasing the recyclable content beyond 25% without significantly lowering the strength properties of the plastic. The recycled plastic materials may be assembled together with a bio-based material. One example display assembly with higher recycled plastic content while maintaining sufficient plastic strength is an assembly having an external frame having 70% recycled PC ABS mixed with 30% fresh PPS (Polyphenylene Sulfide), a diffuser optical film having 60-80% recycled PET mixed with fresh PET, and a light guide path (e.g., plate) having 70% recycled PC mixed with fresh COP (Cyclo Olefin Polymers). The stiffness strength of the display assembly may further be improved by laminating the display assembly with biodegradable adhesives and/or edge-bonded with ultrasound or laser fusion.

17 Claims, 3 Drawing Sheets

DISPLAY ASSEMBLY WITH RECYCLED CONTENT FOR AN INFORMATION HANDLING SYSTEM

BACKGROUND

A. Field of the Disclosure

The disclosure generally relates to a display for an information handling system. In certain embodiments, the disclosure relates to a display for an information handling system, said display having recycled content.

B. Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increase in the number of information handling systems used by consumers, and the pace at which new models are introduced creates a situation where many consumers replace information handling system components on a frequent basis. Many of these components are discarded as waste, end up in landfills, and remain buried in our planet for hundreds of years, if not longer.

BRIEF SUMMARY

A sustainably-sourced and environmentally-friendly display may include recycled, recyclable, and/or biodegradable plastics, adhesives, and metallic components that provide a reduced environmental footprint, as compared to traditional display assemblies. Embodiments of the disclosure allow an increase in the amount of recycled plastic used in the display assembly by introducing other types of plastic material that allow increasing the recyclable content beyond 25% without significantly lowering the strength properties of the plastic. The recycled plastic materials may be assembled together with a bio-based material. One example display assembly with higher recycled plastic content while maintaining sufficient plastic strength is an assembly having an external frame having 70% recycled PC ABS (e.g., a blend comprising a first polycarbonate (PC) and an acrylonitrile butadiene styrene (ABS) polymer, in which at least some of, or all of, the blend is recycled material) mixed with 30% fresh PPS (Polyphenylene Sulfide), a diffuser optical film having 60-80% recycled PET mixed with fresh PET, and a light guide path (e.g., plate) having 70% recycled PC mixed with fresh COP (Cyclo Olefin Polymers). Cycloolefin polymers are materials that contain, or are made from, at least one cyclic monomer, and may be interpreted in this disclosure as including cyclic olefin polymers (COP) and copolymers (COC). The stiffness strength of the display assembly may further be improved by laminating the display assembly with biodegradable adhesives and/or edge-bonded with ultrasound or laser fusion.

Some aspects of the disclosure are directed to a display assembly for an information handling system. The display assembly may include a front external frame and a back external frame each independently comprising a first composition comprising i) a blend comprising a first polycarbonate and an acrylonitrile butadiene styrene (ABS) polymer, and ii) a polyphenylene sulfide; a diffuser optical film layer comprising a polyethylene terephthalate (PET); and/or a light guide plate layer comprising a second composition comprising a second polycarbonate, and a cyclo olefin polymer (COP). In a display assembly, the diffuser optical film layer and the light guide plate layer may be positioned between the front external frame and the back external frame.

In different embodiments of the components or the display assembly one or more of the following may apply: the first composition for the external frame components comprises 50 wt. % to 90 wt. % of the blend, and 10 wt. % to 50 wt. % of the polyphenylene sulfide; the blend for the first composition for the external frame components comprises 40 wt. % to 60 wt. % of the first polycarbonate, and 60 wt. % to 40 wt. % of the ABS polymer; the blend has a recycled content of 90% to 100%; the polyphenylene sulfide has a recycled content less than 5%; the polyphenylene sulfide is a virgin polymer; the PET for the diffuser optical film layer has recycled content of 60% to 80%; the light guide plate layer comprises 50 wt. % to 90 wt. % of the second polycarbonate, and 10 wt. % to 50 wt. % of the cyclo olefin polymer; the second polycarbonate of the light guide plate layer has a recycled content of 90% to 100%; the cyclo olefin polymer of the light guide plate layer has a recycled content less than 5%; the cyclo olefin polymer of the light guide plate layer is a virgin polymer; the cyclo olefin polymer is 50; and/or the display assembly has a recycled content of 25% to 60%. The 25 to 60 wt. % recycled weight content of the display assembly may be measured based on the combined weight of the front and back external frames, the diffuser optical film layer, and the light guide plate layer, or the combined weight of the display assembly including other layers in the display assembly.

One or more of the front external frame, back external frame, diffuser optical film layer, and/or light guide plate layer may be coupled to other components included in a display assembly, including, for example, a polarizing film layer, a liquid crystal display (LCD) module layer, polarizing film layer, a prism sheet layer, a reflector sheet layer, and a backlight module layer. In some embodiments, any or all of the layers included in a display assembly may be laminated together with a biodegradable adhesive. The biodegradable adhesive may include one or more of starch adhesives, dextrin adhesives, PVAC adhesives, PVOH adhesives, or other similar adhesives that break down naturally, eventually. In some embodiments, any or all edges of one or more layers of the display assembly may be bonded with ultrasound and/or laser fusion. In some embodiments, one or both of the front external frame and back external frames have a tensile strength of 40 Mpa to 60 Mpa, as measured in accordance with ASTM D638; elongation at break 20% to 40%, as measured in accordance with ASTM D638; and/or a flexural modulus of 50 Mpa to 70 Mpa, as measured in accordance with ASTM D790A.

The external frame components (e.g., front external frame and back external frame) can include recycled content. In some aspects, the frame components can include steel and from 10 wt. % to 100 wt. % recycled content, greater than 50 wt. %, greater than 75 wt. %, or between 60 wt. % and 80 wt. % recycled content. The frame components can include 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % recycled content. Within the frame components, the polyphenylene sulfide (PS) may have a recycled content less than 5%, such as 4, 3, 2, 1, or 0 wt. %. In some aspects, the polyphenylene sulfide is a virgin polymer. Within the frame components, the blend comprising the polycarbonate (PC) and acrylonitrile butadiene styrene (ABS) polymer may include recycled content, such as the PC including at least some recycled PC, the ABS including at last some recycled ABS, or both the PC and the ABS including recycled content. In some embodiments, the frame components may include plastics, without steel, and include one or more of PS, PC, or ABS.

The diffuser optical film layer can include recycled content. In some aspects, the diffuser optical film layer includes recycled content of 60% to 80%, such as when the PET includes 60, 61, 62, 63, 64, 65, 66, 67, 68, 69, 70, 71, 72, 73, 74, 75, 76, 77, 78, 79, or 80% recycled content. In some aspects, the diffuser optical film layer includes virgin PET.

The light guide plate layer can include recycled content. In some aspects, the light guide plate layer includes recycled content of 90% to 100%, such as when the polycarbonate in the light guide plate layer includes 90, 91, 92, 93, 94, 95, 96, 97, 98, 99, or 100% recycled content. Additionally or alternatively, the cyclo olefin polymer of the light guide plate layer can include less than 5%, such as 4, 3, 2, or 1% recycled content. In some aspects, the cyclo olefin polymer comprises virgin polymer, which may be combined with virgin or recycled polycarbonate in the light guide plate layer. In some embodiments, the light guide plate layer may have a flex modulus of between 2.5-3.5 GPA with compositions comprising 5% or less of PS. In some embodiments, the entire display assembly may be supported by a metal bezel area to provide a flex modulus for the display assembly as a whole of 5-10 GPA.

The following includes definitions of various terms and phrases used throughout this specification.

As used herein recycled content of a material refers to wt. % of the material obtained from, made from and/or recovered from waste. Unless mentioned otherwise the waste can be post-industrial and post-consumer waste. Post-consumer waste of a material is a waste generated by a customer of a substrate containing the material. Post-industrial waste is waste generated during a production process of a product and has not used in the consumer market.

As used herein renewable content of a material refers to wt. % of the material obtained from or made from a bio-based renewable material. Unless mentioned otherwise, bio-based material can include materials from any life form such as plants, animals, fungi, protists, prokaryotes, microbes, algae, bacteria, yeasts and/or molds. The bio-based material can be obtained from natural or genetically engineered species.

A recyclable adhesive is an adhesive that can be fully melted down without yielding any adhesive waste or residue when the end use product has reached its end of life. A biodegradable adhesive is an adhesive that can be broken down by bacteria and other living organisms. A compostable adhesive is a sub-set of biodegradable adhesives. Compostable adhesives are broken down in a compost pile environment and leave no harmful residue or waste behind once fully composted.

As used herein total recycled and renewable content of a material refers to wt. % of the material obtained from, made from and/or recovered from waste and wt. % of the material obtained from or made from a bio-based renewable material. For example, for a 100 gm material is 10 gm is obtained recycled sourced and 10 gm is obtained from renewable source, the total recycled and renewable content of the material is 20 wt. %.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The display assembly of the present invention can "comprise," "consist(s) essentially of," or "consist of" particular ingredients, components, compositions, etc. disclosed throughout the specification. In one aspect of the present invention, and with reference to the transitional phrase "consist(s) essentially of" or "consisting essentially of," a basic and novel characteristic of the present invention can include a display containing (a) a front external frame and a back external frame, at least one of the front external frame and the back external frame comprising a first composition comprising i) a blend comprising a first polycarbonate and an acrylonitrile butadiene styrene (ABS) polymer, and ii) a polyphenylene sulfide; (b) a diffuser optical film layer comprising a polyethylene terephthalate (PET); and/or (c) a light guide plate layer comprising a second composition comprising a second polycarbonate, and a cyclo olefin polymer (COP).

Other objects, features and advantages of the present invention will become apparent from the following detailed description and examples. It should be understood, however, that the detailed description and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings. While the invention is susceptible to various modifications and alternative forms, specific embodiments thereof are shown by way of example in the drawings. The drawings may not be to scale.

DETAILED DESCRIPTION

A sustainably-sourced and environmentally-friendly display may include recycled, recyclable, and/or biodegradable plastics, adhesives, and metallic components that provide a reduced environmental footprint, as compared to traditional display assemblies. Embodiments of the disclosure allow an increase in the amount of recycled plastic used in the display assembly by introducing other types of plastic material that allow increasing the recyclable content beyond 25% without significantly lowering the strength properties of the plastic. The display assembly as a whole, and some or all of the individual layers, exhibit high strength and durability despite high amounts of recyclable content. The high strength can be obtained when combining multiple materials, such as multiple plastics, or multiple recycled plastics. Embodiments of the disclosure provide an environmentally-friendly approach for reducing plastic pollution, as it includes a significant amount of recycled, recyclable, and/or biodegradable material without adversely affecting the structure, usage, durability, or longevity of the display assembly.

These and other non-limiting aspects of the present disclosure are discussed in further detail in the following sections.

Figure 1:
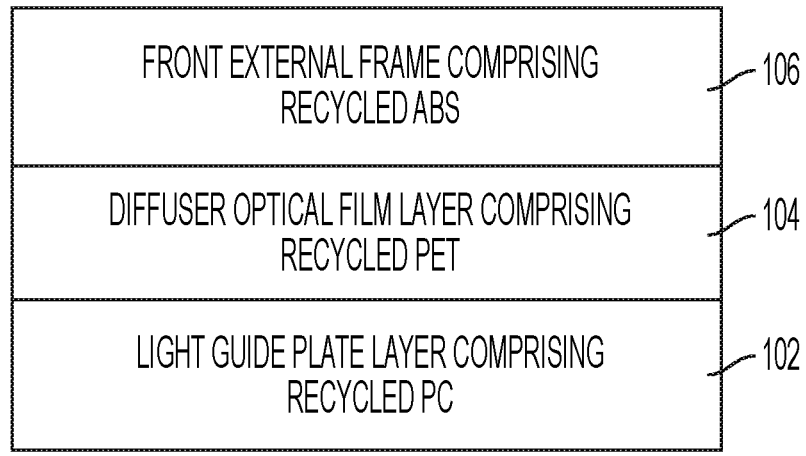
FIG. 1 is a block diagram illustrating a display assembly according to some embodiments of the disclosure.

FIG. 1 is a block diagram illustrating a display assembly according to some embodiments of the disclosure. A display assembly may include at least the three layers 102, 104, and 106. A layer 102 may be a light guide plate layer comprising a second composition comprising a second polycarbonate, and a cyclo olefin polymer (COP). The layer 102 may be a molded layer of the second composition. A layer 104 may be a diffuser optical film layer comprising a polyethylene terephthalate (PET). A layer 106 may include a front external frame comprising recycled acrylonitrile butadiene styrene (ABS) polymer. A total recycled content of the display assembly shown in FIG. 1 may be greater than 25 wt. % and up to 100 wt. %, such as between 25-75 wt. %, between 25-50 wt. %, between 25-40 wt. %, between 50-90 wt. %, between 50-75 wt. %, or between 75-90 wt. %.

A back external frame corresponding to the front external frame layer 106 may be coupled on an opposite side of the display assembly from front external frame layer 106. At least one of the front external frame and the back external frame comprising a first composition comprising (i) a blend comprising a first polycarbonate and an acrylonitrile butadiene styrene (ABS) polymer, and (ii) a polyphenylene sulfide. Additional layers may be included around the layers 102, 104, and 106, or in between layers 102 and 104 and/or between layers 104 and 106. An example of a display assembly with additional layers is shown in FIG. 2.

Figure 2:
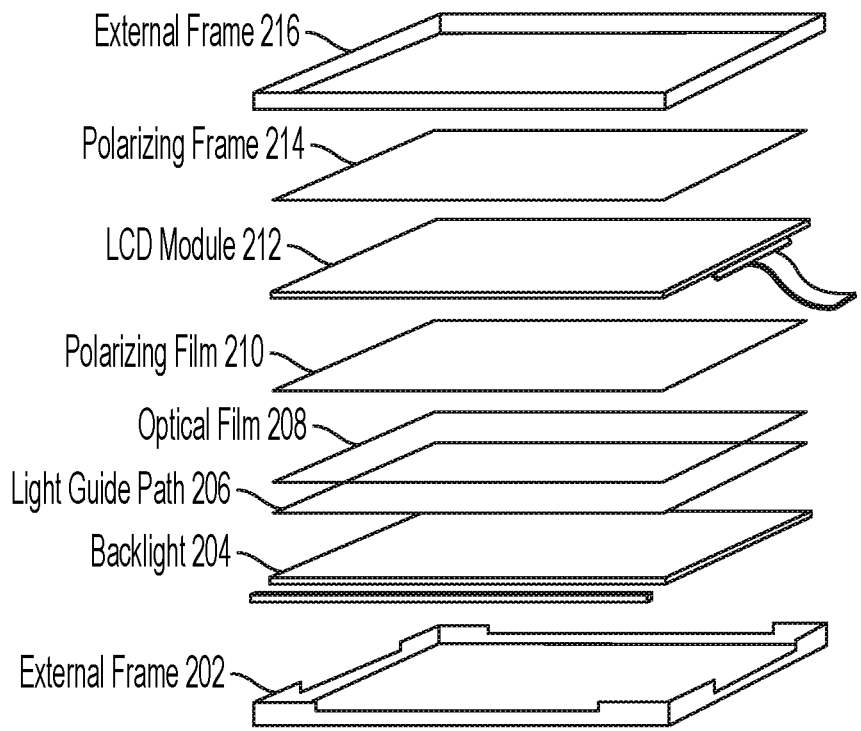
FIG. 2 is an exploded view illustrating a display assembly according to some embodiments of the disclosure.

FIG. 2 is an exploded view illustrating a display assembly according to some embodiments of the disclosure. A display assembly includes a back external frame 202 coupled to a backlight 204. The backlight 204 may generate light used to illuminate the display and create images on the display. The backlight 204 may be coupled to a light guide path 206, such as one of the embodiments of layer 102. The light guide path 206 may distribute light from the backlight 204 across the viewing image generated by the display assembly. The light guide path 206 may include, for example, a combination of recyclable polycarbonate (PC) and a cyclo olefin polymer (COP), wherein the recyclable PC comprises up to or exceeding 70% recycled content, such as between 50-90%, or between 70-90% or between 75-90% or between 80-90%. An optical film 208 may be coupled to the light guide path 206, with a polarizing film 210 coupled to the optical film 208. The optical film 208, which may include a diffuser optical film layer, may comprise a polyethylene terephthalate (PET) of up to or exceeding 80% recycled content. For example, the optical film 208 may include between 60-90%, between 60-80%, between 60-70%, between or between 70-80% recycled PET, with the remainder being virgin PET. The films 208 and 210 condition the light generated by the backlight 204 and distributed by the light guide path 206 for the generation of images, such as by filtering out certain frequencies and/or polarizing the light. A liquid crystal display (LCD) module layer 212 is coupled to the film 210 and may include a plurality of structures for generating images from the backlight 204. For example, the LCD module layer 212 may include a plurality of transistors coupled to color filters corresponding to red, green, and blue components, in which the transistors control the transmission of light through the red, green, and blue components to generate pixels of color, and groupings of those pixels of colors controlled to form images on the display assembly, such as scenes from a movie, reproduction of photographs, and/or generation of user interface (UI) displays. A polarizing film 214 may be coupled over the LCD module 212 to further condition light after passing through the LCD module layer 212. A top external frame 216 may be coupled to the polarizing film 214 and correspond to the bottom external frame 202 such that the frame components 202 and 216 couple together to enclose the display assembly layers including one or more or all of layers 204, 206, 208, 210, 212, and 214. The top external frame 216 may include a composition of PC ABS and PPS, in which some of the PC ABS is recycled content. For example, top external frame 216 may comprise between 50-90%, between 60-80%, between 65-75% PC ABS, or approximately 70% PC ABS, in which the remainder of the composition is PPS. Up to 100% of the PC ABS material (e.g., a blend of polycarbonate and an acrylonitrile butadiene styrene (ABS) polymer) may be recycled content, such as between 25-90%, between 35-80%, or between 50-75% recycled content. Although the display assembly of FIG. 2 illustrates an LCD display assembly, other types of displays may be made with recycled content according to embodiments of the disclosure. For example, organic light emitting diode (OLED) and quantum-dot-enhanced light emitting diode (QLED) displays may similarly include one or more of the layers shown in FIG. 1 or FIG. 2 and include recyclable content in those layers.

Figure 3:
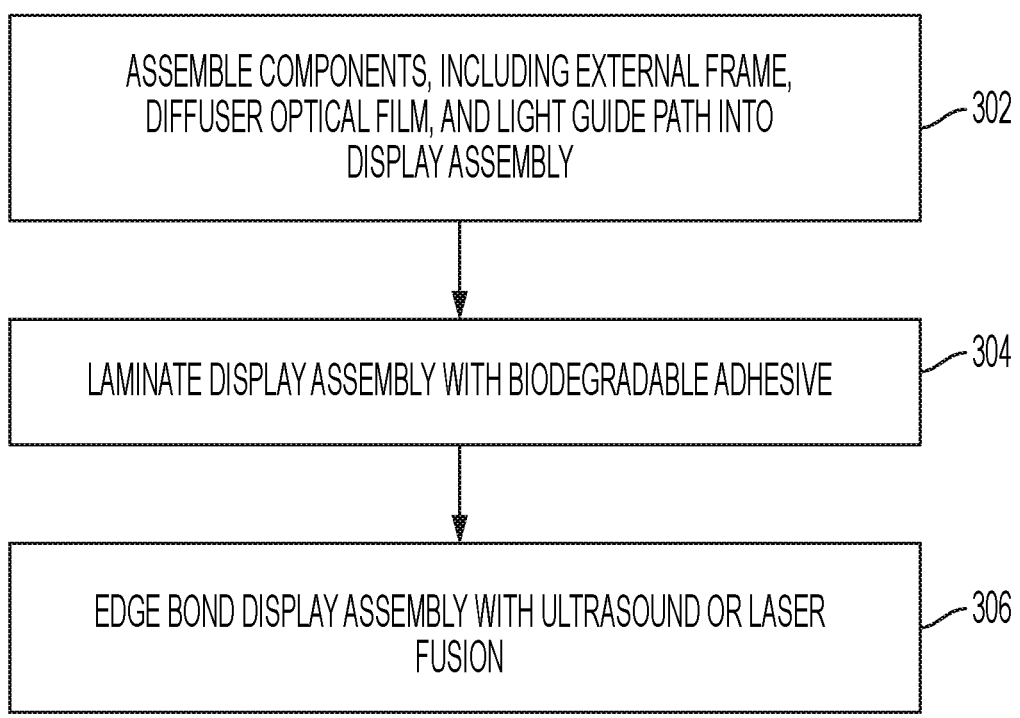
FIG. 3 is a flow chart illustrating a method for assembling a display assembly according to some embodiments of the disclosure.

A display assembly, such as shown in the embodiments of FIG. 1 or FIG. 2, may be assembled in a manner that increases the strength of the display assembly allowing a further increase in the amount of recyclable content included in the display assembly layers. FIG. 3 is a flow chart illustrating a method for assembling a display assembly according to some embodiments of the disclosure. At block 302, the components, including an external frame, a diffuser optical film, and a light guide path are assembled, e.g., placed in order, stacked together, or otherwise arranged, into a display assembly. At block 304, the display assembly is laminated with a biodegradable adhesive. In some embodiments, biodegradable adhesive is used in every layer. In some embodiments, biodegradable adhesive is used in at least one layer. At block 306, the display assembly is edge boded, such as with ultrasound or laser fusion.

Figure 4:
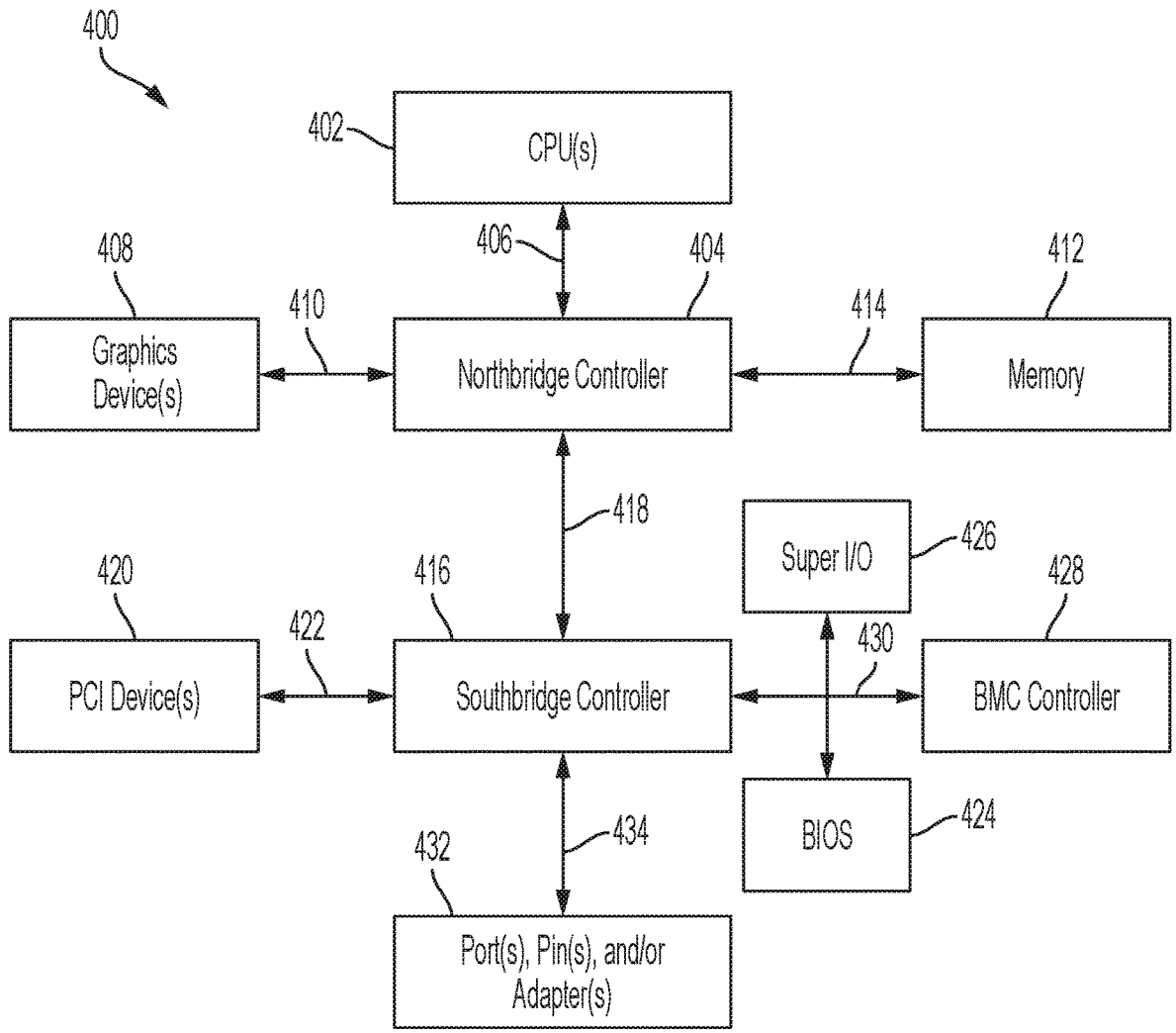
FIG. 4 is a block diagram of an information handling system according to some embodiments of the disclosure.

The display assembly of embodiments herein may be included as part of an information handling system, such as a display on a laptop, tablet, or mobile phone device. The display assembly may alternatively be a stand-alone display, such as an external monitor, configured to couple to an information handling system, through a wired or wireless connection, and display images based on signals received from the information handling system. In either or other configurations the display assembly may be for an information handling system. FIG. 4 is a block diagram of an information handling system according to some embodiments of the disclosure.

FIG. 4 is a schematic of one embodiment of an information handling system that can incorporate a display assembly as described in various embodiments disclosed herein. An information handling system may include a variety of components to generate, process, display, manipulate, transmit, and receive information. One example of an information handling system 400 is shown in FIG. 4. Information handling system 400 may include one or more central processing units (CPUs) 402. In some embodiments, information handling system 400 may be a single-processor system with a single CPU 402, while in other embodiments information handling system 400 may be a multi-processor system including two or more CPUs 402 (e.g., two, four, eight, or any other suitable number). CPU(s) 402 may include any processor capable of executing program instructions. For example, CPU(s) 402 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 402 may commonly, but not necessarily, implement the same ISA.

CPU(s) 402 may be coupled to northbridge controller or chipset 404 via front-side bus 406. The front-side bus 406 may include multiple data links arranged in a set or bus configuration. Northbridge controller 404 may be configured to coordinate I/O traffic between CPU(s) 402 and other components. For example, northbridge controller 404 may be coupled to graphics device(s) 408 (e.g., one or more video cards or adaptors, etc., which may be coupled to display assemblies according to embodiments described herein) via graphics bus 410 (e.g., an Accelerated Graphics Port or AGP bus, a Peripheral Component Interconnect or PCI bus, etc.). Northbridge controller 404 may also be coupled to system memory 412 via memory bus 414. Memory 412 may be configured to store program instructions and/or data accessible by CPU(s) 402. In various embodiments, memory 412 may be implemented using any suitable memory technology, such as static RAM (SRAM), synchronous dynamic RAM (SDRAM), nonvolatile/Flash-type memory, or any other type of memory.

Northbridge controller 404 may be coupled to southbridge controller or chipset 416 via internal bus 418. Generally, southbridge controller 416 may be configured to handle various of information handling system 400's I/O operations, and it may provide interfaces such as, for instance, Universal Serial Bus (USB), audio, serial, parallel, Ethernet, etc., via port(s), pin(s), and/or adapter(s) 432 over bus 434. For example, southbridge controller 416 may be configured to allow data to be exchanged between information handling system 400 and other devices, such as other information handling systems attached to a network. In various embodiments, southbridge controller 416 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 416 may also enable connection to one or more keyboards, keypads, touch screens, scanning devices, voice or optical recognition devices, or any other devices suitable for entering or retrieving data. Multiple I/O devices may be present in information handling system 400. In some embodiments, I/O devices may be separate from information handling system 400 and may interact with information handling system 400 through a wired or wireless connection. As shown, southbridge controller 416 may be further coupled to one or more PCI devices 420 (e.g., modems, network cards, sound cards, video cards, etc.) via PCI bus 422. Southbridge controller 416 may also be coupled to Basic I/O System (BIOS) 424, Super I/O Controller 426, and Baseboard Management Controller (BMC) 428 via Low Pin Count (LPC) bus 430.

Information handling system 400 may be configured to access different types of computer-accessible media separate from memory 412. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to information handling system 400 through various interfaces, such as universal serial bus (USB) interfaces, via northbridge controller 404 and/or southbridge controller 416. Some such mediums may be coupled to the information handling system through a Super I/O Controller 426 combines interfaces for a variety of lower bandwidth or low data rate devices. Those devices may include, for example, floppy disks, parallel ports, keyboard and mouse and other user input devices, temperature sensors, and/or fan speed monitoring.

BIOS 424 may include non-volatile memory having program instructions stored thereon. The instructions stored on the BIOS 424 may be usable by CPU(s) 402 to initialize and test other hardware components. The BIOS 424 may further include instructions to load an Operating System (OS) for execution by CPU(s) 402 to provide a user interface for the information handling system 400, with such loading occurring during a pre-boot stage. In some embodiments, firmware execution facilitated by the BIOS 424 may include execution of program code that is compatible with the Unified Extensible Firmware Interface (UEFI) specification, although other types of firmware may be used.

BMC controller 428 may include non-volatile memory having program instructions stored thereon that are usable by CPU(s) 402 to enable remote management of information handling system 400. For example, BMC controller 428 may enable a user to discover, configure, and/or manage BMC controller 428. Further, the BMC controller 428 may allow a user to setup configuration options, resolve and administer hardware or software problems, etc. Additionally or alternatively, BMC controller 428 may include one or more firmware volumes, each volume having one or more firmware files used by the BIOS firmware interface to initialize and test components of information handling system 400.

One or more of the devices or components shown in FIG. 4 may be absent, or one or more other components may be added. Further, in some embodiments, components may be combined onto a shared circuit board and/or implemented as a single integrated circuit (IC) with a shared semiconductor substrate. For example, northbridge controller 404 may be combined with southbridge controller 416, and/or be at least partially incorporated into CPU(s) 402. Accordingly, systems and methods described herein may be implemented or executed with other computer system configurations. In some cases, various elements shown in FIG. 4 may be mounted on a motherboard and enclosed within a chassis of the information handling system 400.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. A display assembly for an information handling system, the display assembly comprising:
a front external frame and a back external frame;
a diffuser optical film layer comprising a polyethylene terephthalate (PET); and
a light guide plate layer comprising a second composition comprising a polycarbonate (PC), and a cyclo olefin polymer (COP),
wherein the diffuser optical film layer and the light guide plate layer are positioned between the front external frame and the back external frame, and
wherein the display assembly is constructed of a plurality of materials, wherein the plurality of materials have a recycled content of greater than 25% by weight of the display assembly, and wherein the plurality of materials include the polyethylene terephthalate, the polycarbonate, and the cyclo olefin polymer.

2. The display assembly of claim 1, wherein at least one of the front external frame and the back external frame comprises a first composition comprising i) a blend comprising a first polycarbonate (PC) and an acrylonitrile butadiene styrene (ABS) polymer, and ii) a polyphenylene sulfide (PS).

3. The display assembly of claim 2, wherein the first composition comprises 50 wt. % to 90 wt. % of the blend, and 10 wt. % to 50 wt. % of the polyphenylene sulfide.

4. The display assembly of any one of claim 2, wherein the blend comprises 40 wt. % to 60 wt. % of the polycarbonate, and 60 wt. % to 40 wt. % of the ABS polymer.

5. The display assembly of claim 2, wherein the blend has a recycled content of 90% to 100 wt. % of the blend.

6. The display assembly of claim 2, wherein the polyphenylene sulfide has a recycled content less than 5 wt. % of the polyphenylene sulfide.

7. The display assembly of claim 1, wherein at least one of the front external frame and the back external frame comprises steel comprising recycled content of 60 wt. % to 80 wt. % of the steel.

8. The display assembly of claim 1, wherein the PET has recycled content of 60 wt. % to 80 wt. % of the PET.

9. The display assembly of claim 1, wherein the light guide plate layer comprises 50 wt. % to 90 wt. % of the polycarbonate, and 10 wt. % to 50 wt. % of the cyclo olefin polymer.

10. The display assembly of claim 1, wherein the polycarbonate has a recycled content of 90 wt. % to 100 wt. % of the polycarbonate.

11. The display assembly of claim 1, wherein the cyclo olefin polymer has a recycled content less than wt. 5% of the cyclo olefin polymer.

12. The display assembly of claim 1, wherein the plurality of materials have a recycled content of between 25% to 60% by weight of the display assembly.

13. The display assembly of claim 1, further comprising one or more additional layers selected from a polarizing film layer, a liquid crystal display (LCD) module layer, polarizing film layer, a prism sheet layer, a reflector sheet layer, and a backlight module layer.

14. The display assembly of claim 1, wherein one or more layers of the display assembly are laminated with a biodegradable adhesive.

15. The display assembly of claim 1, wherein edges of the one or more layers of the display assembly are bonded with ultrasound and/or laser fusion.

16. An information handling system, comprising:
a display assembly, comprising:
- a front external frame and a back external frame, at least one of the front external frame and the back external frame comprising a first composition comprising i) a blend comprising a first polycarbonate (PC) and an acrylonitrile butadiene styrene (ABS) polymer, and ii) a polyphenylene sulfide (PS);
- a diffuser optical film layer comprising a polyethylene terephthalate (PET); and
- a light guide plate layer comprising a second composition comprising a second polycarbonate (PC), and a cyclo olefin polymer (COP),
- wherein the display assembly is constructed of a plurality of materials, wherein the plurality of materials have a recycled content of greater than 25% by weight of the display assembly, and wherein the plurality of materials include the polyethylene terephthalate, the polycarbonate, and the cyclo olefin polymer.

17. The information handling system of claim 16, wherein the plurality of materials have a recycled content of between 25% to 60% by weight of the display assembly.

* * * * *